United States Patent [19]
Gadd

[11] Patent Number: 6,032,774
[45] Date of Patent: *Mar. 7, 2000

[54] ONE WAY DRIVE DEVICE WITH A DOG CLUTCH TO TRANSMIT TORQUE AND A RATCHET CLUTCH TO PROVIDE AN OVERRUN FUNCTION

[75] Inventor: Craig T. Gadd, Solana Beach, Calif.

[73] Assignee: Epilogics, L.P., Los Gatos, Calif.

[ * ] Notice: This patent is subject to a terminal disclaimer.

[21] Appl. No.: 08/999,164

[22] Filed: Dec. 30, 1997

[51] Int. Cl.[7] .............. F16D 11/14; F16D 19/00; F16D 41/12; F16D 43/20
[52] U.S. Cl. .............. 192/35; 192/46; 192/48.6; 192/54.5; 192/69.3; 192/69.82
[58] Field of Search .............. 192/35, 46, 48.6, 192/54.5, 69.1, 69.3, 69.82, 93 A

[56] References Cited

U.S. PATENT DOCUMENTS

| | | |
|---|---|---|
| 1,841,234 | 1/1932 | Williams . |
| 3,306,406 | 2/1967 | Poliseo . |
| 3,721,325 | 3/1973 | Richmond . |
| 4,274,523 | 6/1981 | Sigg . |
| 5,070,978 | 12/1991 | Pires . |
| 5,085,305 | 2/1992 | Cheng . |
| 5,699,889 | 12/1997 | Gadd ........................ 192/35 |

*Primary Examiner*—Rodney H. Bonck
*Attorney, Agent, or Firm*—Brooks & Kushman P.C.

[57] ABSTRACT

A one way drive device for transmitting torque from a rotational input to a rotational output when the device is driven in a counterclockwise torque transmitting rotational direction by the rotational input. The device allows the rotational input to freely rotate in a clockwise overrun direction relative to the rotational output. The one way drive device includes a dog clutch to transmit torque when driven in the torque transmitting direction and a ratchet clutch to provide the overrun function.

11 Claims, 7 Drawing Sheets

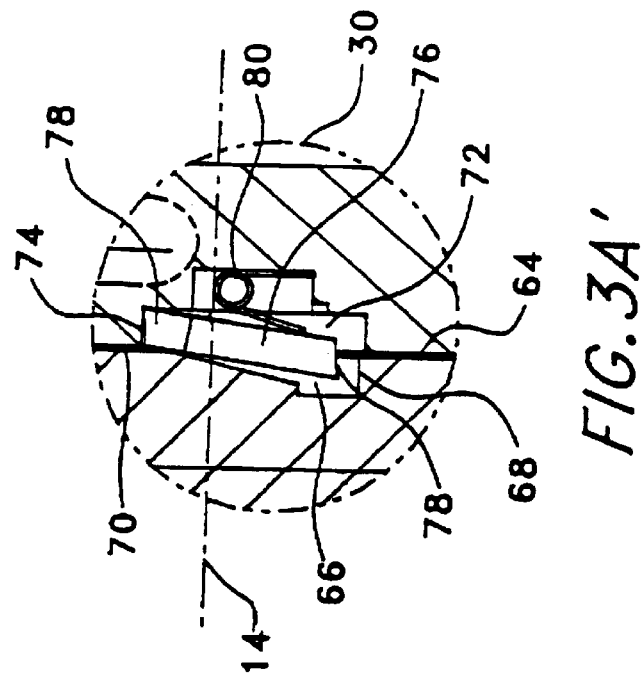
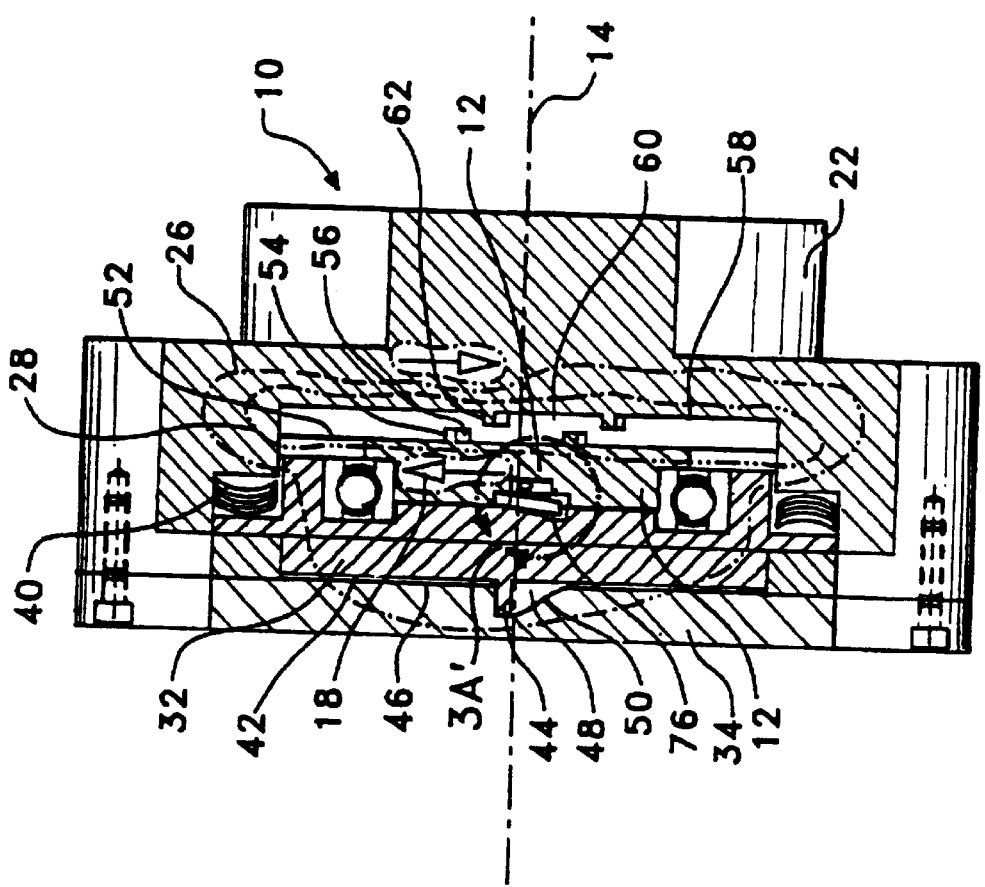
FIG.3A'
FIG.3A

6,032,774

ONE WAY DRIVE DEVICE WITH A DOG CLUTCH TO TRANSMIT TORQUE AND A RATCHET CLUTCH TO PROVIDE AN OVERRUN FUNCTION

BACKGROUND OF THE INVENTION

The present invention relates generally to a one way drive device, and more particularly to a one way drive device which uses a dog clutch to transmit torque when driven in a torque transmitting direction and a ratchet clutch to provide an overrun function.

There are a variety of types of overrunning clutches including ratchet clutches, dog clutches, and traction type clutches such as roller ramp or sprag clutches. Each of the different types of clutches has certain advantages over the other types of clutches. For instance, for a given size clutch, applicant has found that dog clutches are generally better suited to transmit torque than ratchet and traction type clutches. This allows dog clutches to transmit loads which are larger then ratchet and traction type clutches are able to withstand. Applicant has also found that ratchet clutches generally provide a better overrun function and may be designed to provide extremely high overrunning speeds.

The present invention provides a novel one way drive device which uses a dog type clutch as a coupling arrangement to transmit torque and a ratchet type clutch to provide the overrun function and to move the dog clutch between the engaged and disengaged positions. Because the device does not rely on the ratchet clutch to transmit torque, the ratchet clutch may be designed to allow extremely high overrun speeds. When torque is required to be transmitted the dog clutch is used. This allows loads to be transmitted to an extent that a conventional ratchet clutch would not be able to withstand.

SUMMARY OF THE INVENTION

As will be described in more detail hereinafter, a one way drive device is disclosed which including a drive member, a driven member, and a coupling arrangement having a coupling member separate from but positioned adjacent to the drive member and the driven member. The drive member is mounted for rotation about a given axis either in a clockwise overrunning direction or a counterclockwise torque transmitting direction in response to a rotational input. The driven member is mounted for rotation about the given axis, at least in the counterclockwise torque transmitting direction. The coupling member is mounted for counterclockwise rotation with the driven member. The coupling member is also mounted relative to the driven member for movement between a first position and a second position. The first position allows the drive member to rotate freely in the clockwise overrun direction relative to the driven member and the coupling member itself. The second position rotationally engages the drive member directly to the driven member so that when the drive member is driven by the rotational input in the torque transmitting counterclockwise direction it moves the driven member with it. The coupling member is configured to move from its first position to its second position in response to and as a result of initial rotational movement of the drive member in the torque transmitting counterclockwise direction relative to the driven member.

In accordance with another feature of the present invention, the drive member and the driven member are mounted for limited axial movement relative to one another along the given axis between a disengaged position and an engaged position. In the disengaged position, the drive member is allowed to rotate freely relative to the driven member. In the engaged position, the drive member directly engages the driven member rotationally coupling the drive member to the driven member. The one way drive device further includes a biasing arrangement for biasing the coupling member in its first position and the drive member and the driven member into the disengaged position. The coupling member causes the drive member and the driven member to move from the disengaged position to the engaged position when the coupling member itself is caused to move from its first position to its second position. The coupling member is caused to move from its first position to its second position by the initial rotational movement of the drive member in the torque transmitting counterclockwise direction relative to the driven member.

In accordance with another feature, the coupling arrangement of the one way drive device includes a dog clutch arrangement between the drive member and the driven member. The dog clutch arrangement includes a dog clutch planar drive face on the drive member normal to the given axis. The dog clutch arrangement also includes a dog clutch planar driven face on the driven member normal to the given axis and in close proximity to and in confronting, coplanar relationship with the dog clutch planar drive face of the drive member. One of the dog clutch planar faces has at least one dog carried by its planar face, each dog having an engaging edge. The other of the dog clutch planar faces has at least one corresponding recess formed into its planar face. Each dog on the one planar face has a corresponding recess on the other planar face and each corresponding recess has an shoulder adapted for engagement with its associated dog's engaging edge. Each engaging edge of each dog is caused to engage the shoulder of its corresponding recess when the coupling member causes the drive member and the driven member to move from the disengaged position to the engaged position. The dogs and recesses are arranged to allow the drive member to rotate freely relative to the driven member when the drive member and the driven member are in the disengaged position.

In accordance with still another feature, the coupling arrangement of the one way drive device further includes a ratchet clutch arrangement between the drive member and the coupling member. The ratchet clutch arrangement allows the drive member to rotate freely relative to the coupling member when the drive member is rotating in the overrun direction relative to the coupling member. On the other hand, the ratchet clutch arrangement engages and rotationally couples the coupling member to the drive member when the drive member is being driven by the rotational input in the torque transmitting counterclockwise direction relative to the coupling member.

In the embodiment disclosed, the ratchet clutch arrangement includes a ratchet clutch planar face on the drive member normal to the given axis and confronting the coupling member. The ratchet clutch arrangement also includes a ratchet clutch planar face on the coupling member normal to the given axis and in close proximity to and coplanar with the ratchet clutch planar face of the drive member. The drive member ratchet clutch planar face has at least one pocket in its planar face with each pocket having a shoulder. The coupling member ratchet clutch planar face also has at least one pocket in its planar face with each pocket having a shoulder. The ratchet clutch arrangement further includes at least one pawl having opposing shoulder engaging edges. Each pawl is carried by a corresponding pocket of one of the ratchet clutch planar faces for movement between a biased first position and a second position. Each pawl is arranged such that when the rotational input is driving the drive member in the torque transmitting direction relative to the coupling member, at least one of the pawls carried by the one ratchet clutch planar face engages one of the shoulders of a confronting pocket in the other ratchet clutch planar face while the pawl is in its biased position. This rotationally couples the coupling member to the drive member, thereby causing the coupling member to move the drive member into rotational engagement with the driven member. Each pawl is also arranged such that when the rotational input is driving the drive member in the overrunning direction relative to the coupling member, each pawl is periodically forced to its second position by the shoulder of each of the confronting pockets so as to allow the drive member to rotate freely relative to the coupling member in the overrun clockwise direction relative to the coupling member.

Further describing the embodiment disclosed, the coupling arrangement of the one way drive device also includes a cam arrangement for causing the coupling member to move from its first biased position to its second position by the initial rotational movement of the drive member in the torque transmitting counterclockwise direction relative to the driven member. In this embodiment, the one way drive device further includes an attached plate connected to and forming part of the driven member and extending from the driven member around the outer periphery of the drive member and the coupling arrangement forming a housing around the drive member and the coupling arrangement. The cam arrangement includes a first cam follower planar face on the interior surface of the attached plate in a plane normal to the given axis in confronting relationship with the coupling member. The cam arrangement also includes a second cam follower planar face on the coupling member in a plane normal to the given axis and in close proximity to and in confronting, coplanar relationship with the first cam follower planar face. One of the cam follower planar faces has at least one cam follower protruding from its planar face. And the other cam follower planar face has at least one associated cam recess in its planar face. Each cam recess has a cam surface for moving its associated cam follower in the direction of the given axis in a way which causes the coupling member to move from its first position to its second position by the initial rotational movement of the drive member in the torque transmitting counterclockwise direction relative to the driven member.

BRIEF DESCRIPTION OF THE DRAWINGS

The features of the present invention may best be understood by reference to the following description of the presently preferred embodiments together with the accompanying drawings in which:

FIGS. 3A, 3A' are diagrammatic cross sectional views along line 3—3 in FIG. 2 of the one way drive device of FIG. 2 showing the configuration of the device when the drive member is rotating in the overrun clockwise direction relative to the driven member;

DETAILED DESCRIPTION

Figure 1:
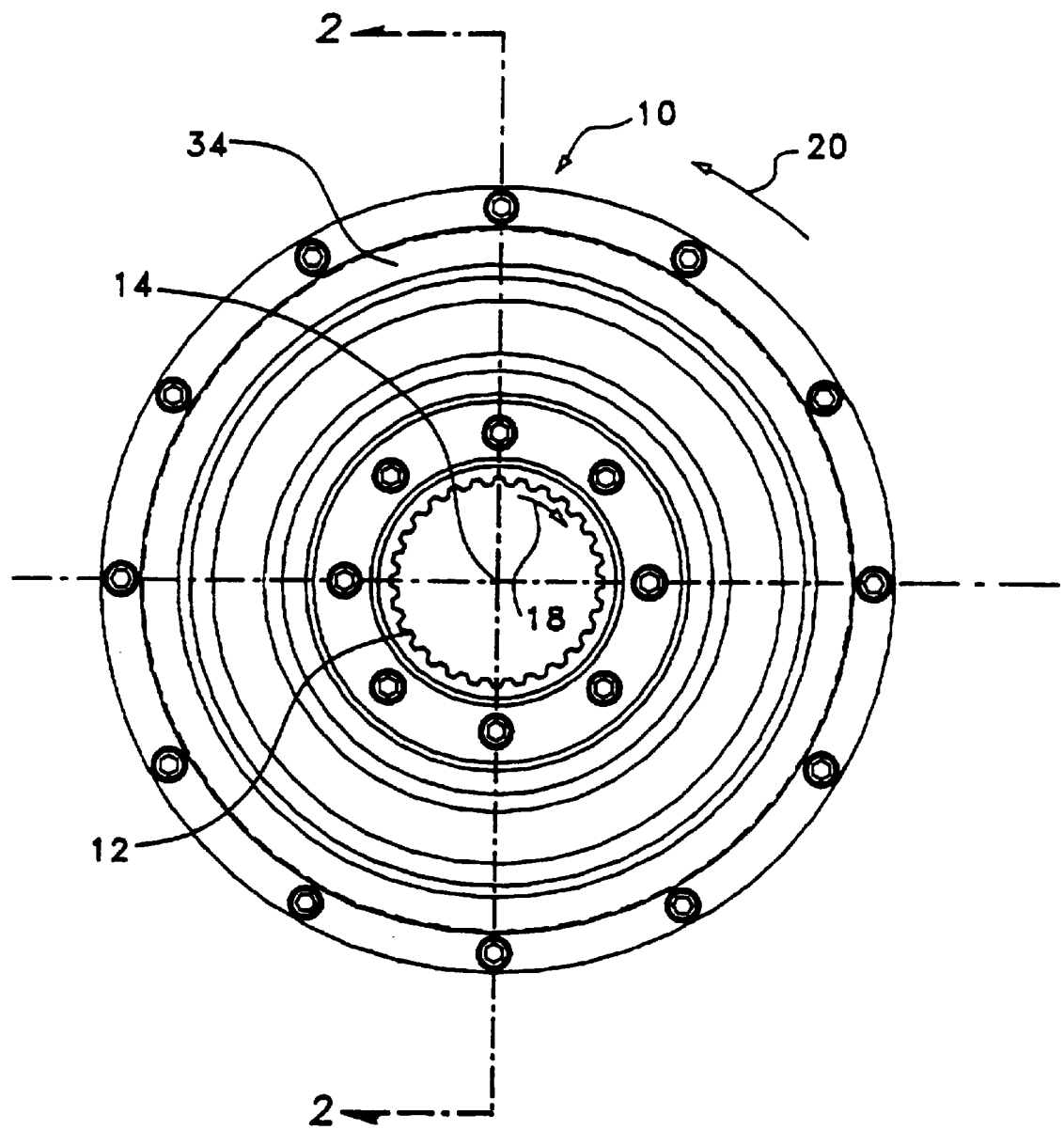
FIG. 1 is a diagrammatic plan view of a one way drive device designed in accordance with the present invention and including a drive member mounted for rotation about a given axis in a counterclockwise torque transmitting direction as viewed in the figure and a clockwise overrun direction, a driven member, a plate attached to the driven member, and a coupling arrangement including a coupling member for rotationally coupling the drive member to the driven member.
Figure 2:
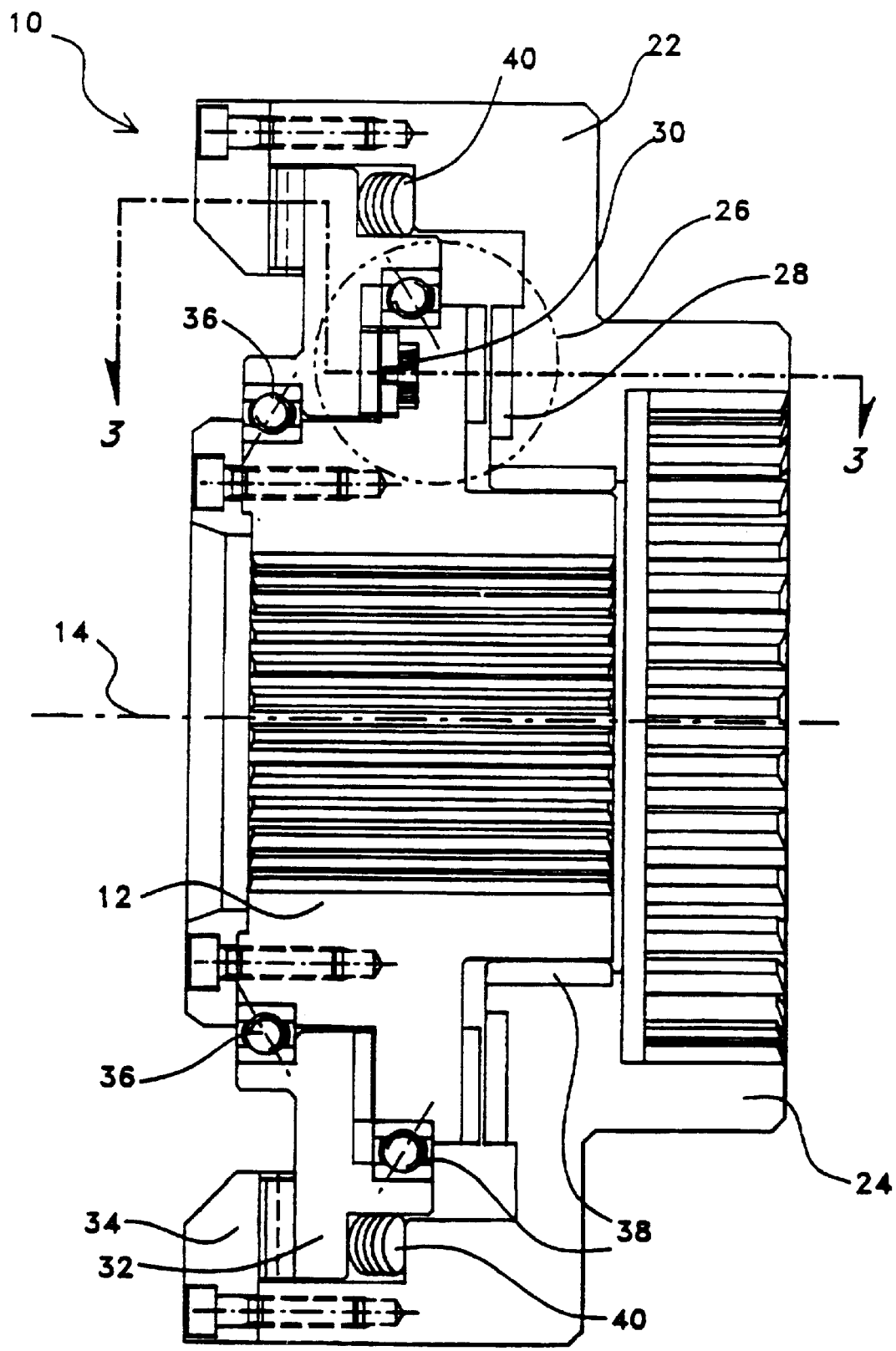
FIG. 2 is a diagrammatic cross sectional view of the one way drive device shown in FIG. 1 taken along line 2—2 in FIG. 1.

Referring to FIGS. 1–3, a preferred embodiment of a one way drive device designed in accordance with the present invention and generally designated by reference numeral 10 will be described in detail. Referring initially to FIGS. 1 and 2, one way drive device 10 includes a drive member 12 adapted to receive rotational input about a given axis 14. In this particular embodiment, drive member 12 has a splined central opening 16 for receiving the rotational input from a cooperating drive shaft or other suitable arrangement (not shown). Drive member 12 is adapted to receive rotational input about axis 14 in either a clockwise overrunning direction, indicated by arrow 18 in FIG. 1, or a counterclockwise torque transmitting direction, indicated by arrow 20 in FIG. 1. Drive device 10 also includes a driven member 22 which is mounted for rotation about axis 14 in at least counterclockwise torque transmitting direction 20. Driven member 22 is adapted to transmit a rotational output when driven in counterclockwise direction 20. In this particular embodiment, driven member 22 has a geared outer peripheral edge surface 24 for transmitting its counterclockwise rotation to an external component (not shown) when driven in torque transmitting direction 20. Although the embodiment being described uses splined and geared surfaces to receive and transmit the rotational input and output, it should be understood that a wide variety of other mechanisms such as pulleys, sprockets, keyed shafts or any other conventional arrangements for transmitting or coupling rotational input may be used instead of the splined and geared surfaces.

As will be described in more detail hereinafter, drive member 12 is also mounted for limited axial movement relative to driven member 22 along axis 14 between a first position disengaged from driven member 22 and a second position engaged with driven member 22. One way drive device 10 further includes a coupling arrangement 26 having a dog clutch 28 and a ratchet clutch 30. Dog clutch 28 is located between drive member 12 and driven member 22 and rotationally couples drive member 12 to driven member 22 when drive member 12 is in its engaged position and driven in counterclockwise torque transmitting direction 20. Coupling arrangement 26 also includes a coupling member 32 positioned adjacent to drive member 12 opposite the driven member. Ratchet clutch 30 is located between drive member 12 and coupling member 32. In accordance with the present invention, ratchet clutch 30 rotationally couples drive member 12 to coupling member 32 in response to and as a result of initial rotational movement of drive member 12 in torque transmitting direction 20 relative to coupling member 32 and driven member 22. As will also be described in more detail hereinafter, when ratchet clutch 30 rotationally couples drive member 12 to coupling member 32, coupling member 32 is caused to move drive member 12 from its first disengaged position to its second engaged position. This movement of drive member 12 into the engaged position causes dog clutch 28 to engage, thereby rotationally coupling drive member 12 to driven member 22. Ratchet clutch 30 also allows drive member 12 to rotate freely in the clockwise overrunning direction 18 relative to coupling member 32.

By using dog clutch 28 to transmit torque, the drive device of the present invention is able to transmit loads greater than would be possible using a similarly sized conventional one way drive device including only a ratchet clutch arrangement. Furthermore, since ratchet clutch 30, when driven in the torque transmitting direction, is only used to engage dog clutch 28, it is not required to transmit large loads. This allows ratchet clutch 30 to be designed to provide extremely high overrun speeds without reducing the torque transmitting capabilities of the overall one way drive device. Therefore, the one way drive device disclosed herein in accordance with the present invention provides for the transmission of larger loads than comparably sized conventional ratchet style devices while also providing for higher overrunning speeds than comparably sized conventional dog clutch devices.

One way drive device 10 further includes an attached plate 34 fixed to drive member 22 forming a housing around the outer periphery of drive member 12 and coupling member 32. Although attached plate 34 is shown and described as a separate component attached to driven member 22, this is not a requirement of the invention. Alternatively, plate 34 may be eliminated by extending driven member 22 around at least portions of drive member 12 and coupling member 32. Therefore, the disclosed invention would equally apply so long as the driven member or an arrangement attached to the driven member cooperates with the coupling member to move the drive member into its engaged position in response to and as a result of initial rotational movement of the drive member in the torque transmitting direction relative to the driven member.

As shown best in FIG. 2, in the embodiment being described, coupling member 32 and driven member 22 along with plate 34 are rotationally mounted around drive member 12 using bearings 36 and 38. These bearings allow drive member 12 to freely rotate in overrunning direction 18 relative to driven member 22 and coupling member 32. One way drive device 10 further includes a wave spring 40 positioned between drive member 12 and driven member 22 for biasing drive member 12 and coupling member 32 into their first positions axially spaced and disengaged from the driven member. With the drive and coupling members in this position, dog clutch 28 is fully disengaged and therefore allows drive member 12 to freely rotate in overrunning direction 18 as best shown in FIG. 3A. Although the embodiment described herein uses bearings 36 and 38 to mount driven member 22 and coupling member 32 for rotation about drive member 12 and wave spring 40 to bias drive member 12 in its first position, it should be understood that a wide variety of other conventional arrangements may be used. These other arrangements may include other configurations of bearings, bushings, clips, other types of guides, and other types of springs so long as the arrangement maintains the required positional relationships between the drive member, the driven member, and the coupling member. The function and use of such other components are held to be familiar to those skilled in the art, and, when considered along with this disclosure, are therefore to be regarded as falling within the scope of the present invention.

Figure 4A:
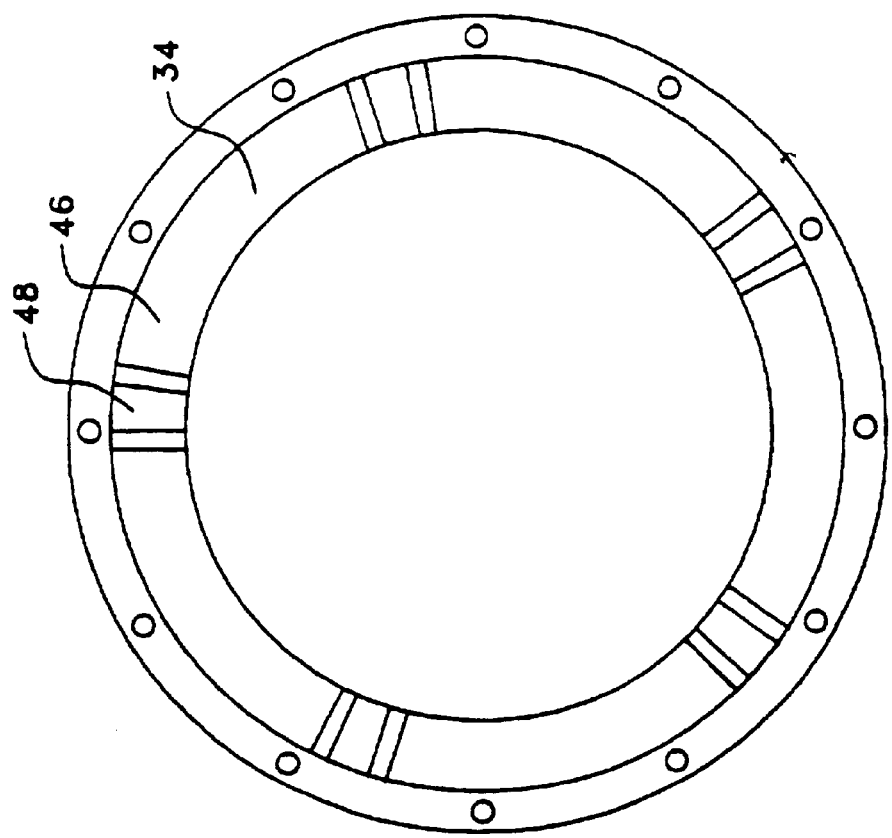
FIG. 4A is a side elevational view of an inside surface of the attached plate of FIG. 1.
Figure 3B:
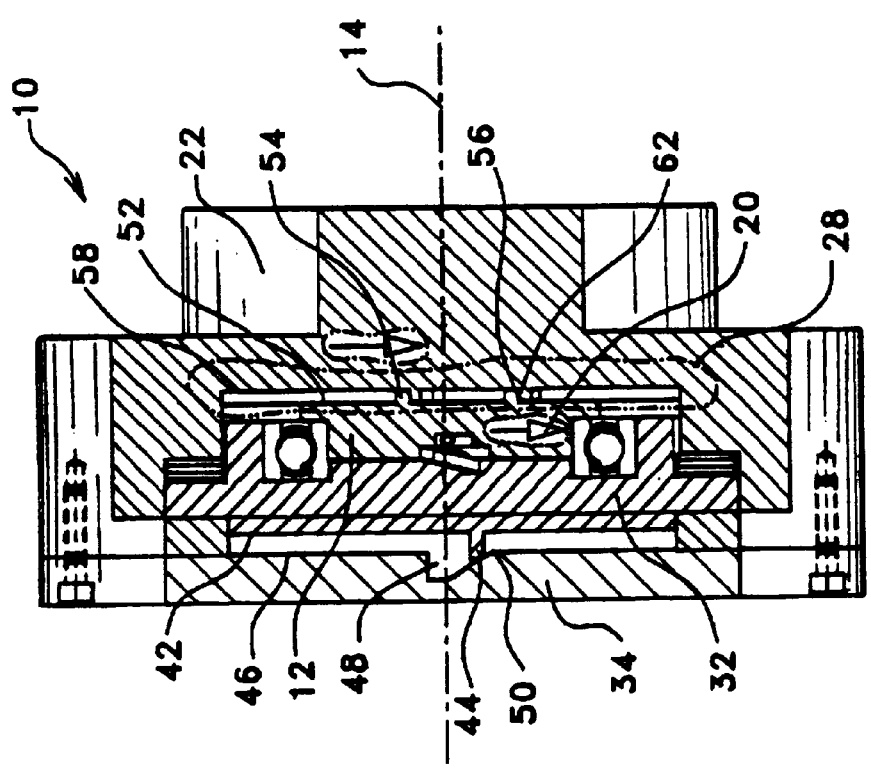
FIG. 3B is a diagrammatic cross sectional view along line 3—3 of the one way drive device of FIG. 2 showing the rotational coupling of the drive member to the driven member when the device is being driven in the torque transmitting counterclockwise direction.
Figure 4B:
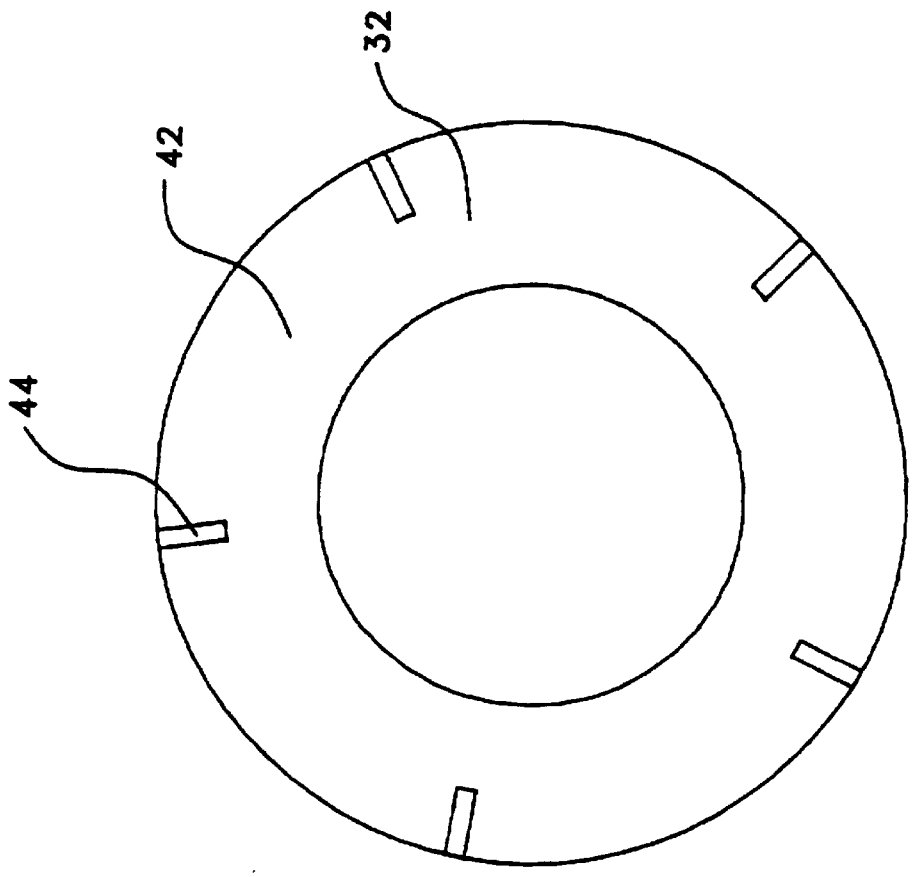
FIG. 4B is a side elevational view of a first side of the coupling member of FIG. 1.

Referring now to FIGS. 3A and 3B, one preferred embodiment of the coupling arrangement 26 will be described in detail. In this embodiment, coupling member 32 is mounted for at least counterclockwise rotation (the torque transmitting direction) with drive member 12 and with driven member 22. Coupling member 32 is also mounted for limited axial movement along axis 14 relative to driven member 22 between a first disengaged position illustrated in FIG. 3A and a second engaged position illustrated in FIG. 3B. Coupling member 32 includes a cam follower planar face 42 which is normal to axis 14. Cam follower planar face 42 has at least one cam follower 44 protruding from its surface. Plate 34 also includes a cam follower planar face 46 on its interior surface which is normal to axis 14 and in close proximity to and in confronting relationship with cam follower planar face 42 on coupling member 32. Cam follower planar face 46 has at least one cam recess 48 having a cam surface 50. Each cam recess 48 has an associated cam follower 44 on coupling member 32. Also, each cam surface 50 cooperates with its associated cam follower 44 to move coupling member 32 axially relative to driven member 22 from its first disengaged position (shown in FIG. 3A) to its second engaged position (shown in FIG. 3B) along axis 14 as a result of the initial rotational movement of coupling member 32 in torque transmitting direction 20. As shown in FIG. 4A and 4B which are plan views of cam follower planar faces 46 and 42 respectively, in the embodiment being described, all of the cam recesses 48 and all of the associated cam followers 44 are positioned in or on its planar face in spaced apart relationship to one another about axis 14 such that they extend radially outward from axis 14.

Although the arrangement for moving coupling member 32 from its first position to its second position has been described as including cam follower planar faces with cam followers and associated cam recesses, it should be understood the arrangement for moving coupling member 32 may take a variety of specific forms. For example, the cam followers may be located on the attached plate and the associated recesses located in the coupling member. Alternatively, the outermost circumferential edge surface of the coupling member rather than the surface normal to axis 14 may include cam protrusions which follow recesses formed into the driven member adjacent the outermost circumferential edge surface of the coupling member. For example, the outer circumferential edge may be threaded into the driven member or attached plate such that any rotational movement of the coupling member relative to the driven member or attached plate moves the coupling member axially along axis 14. With this arrangement, when the ratchet clutch couples the coupling member to the drive member, the initial rotational movement of the coupling member and the drive member relative to the driven member and the attached plate causes the coupling member to move the drive member to the engaged position. So long as the coupling member moving arrangement moves the coupling member from its first position to its second position in response to and as a result of the initial rotational movement of the drive member, any such coupling member moving arrangements may be incorporated.

Figure 5A:
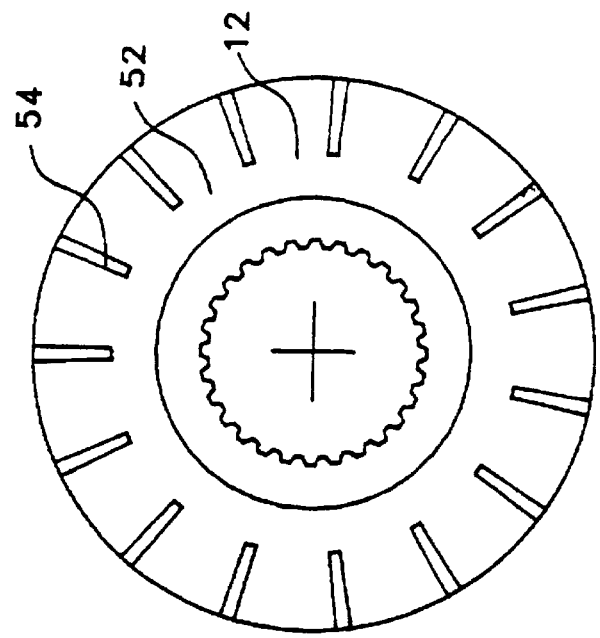
FIG. 5A is a side elevational view of a first side of the drive member of FIG. 1.
Figure 5B:
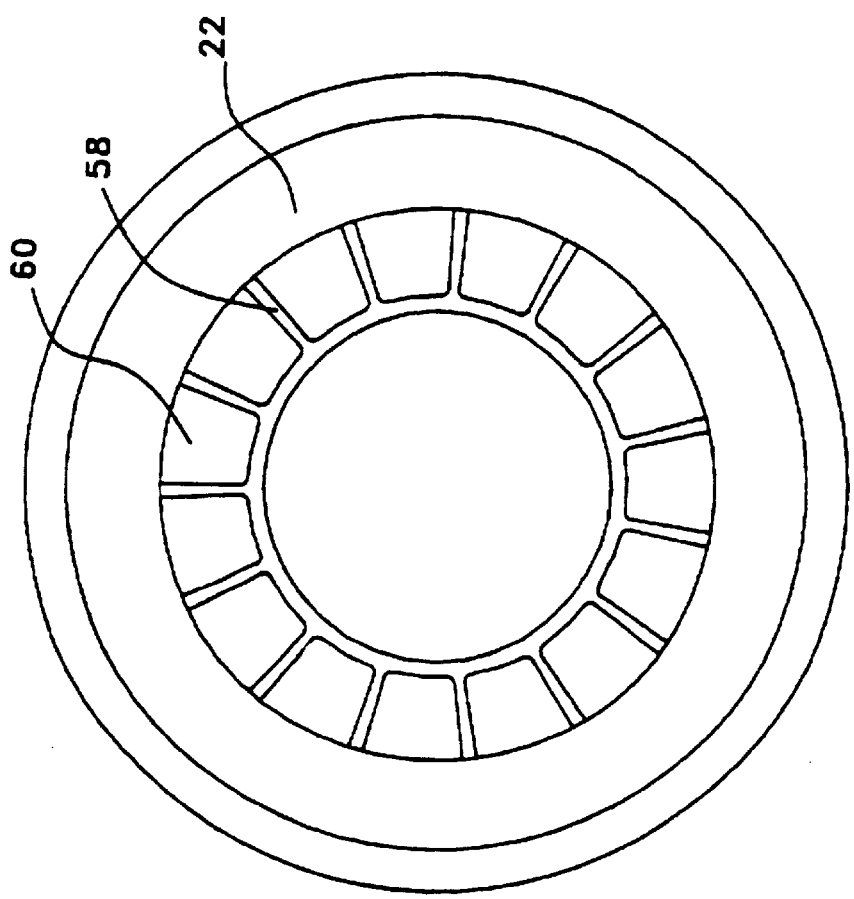
FIG. 5B is a side elevational view of a first side of the driven member of FIG. 1.

Still referring to FIGS. 3A and 3B, dog clutch 28 will now be described in detail. As mentioned above, dog clutch 28 is located between drive member 12 and driven member 22. In this particular embodiment, dog clutch 28 includes a dog clutch planar face 52 on drive member 12. Dog clutch planar face 52 is normal to axis 14 and has at least one dog 54 protruding from its planar face. Each dog 54 has an engaging edge 56. Dog clutch 28 also includes a dog clutch planar face 58 on driven member 22 which is normal to axis 14 and in close proximity to and in coplanar, confronting relationship with dog clutch planar face 52 on drive member 12. Dog clutch planar face 58 has at least one corresponding recess 60 formed into its planar face. Each recess 60 has a corresponding dog 54 and each recess 60 has a shoulder 62 adapted for engagement with its corresponding dog's engaging edge 56. As shown in FIG. 5A and 5B which are plan views of dog clutch planar faces 52 and 58 respectively, dogs 54 and corresponding recesses 60 are positioned in or on its planar face in spaced apart relationship to one another about axis 14 such that they extend radially outward from axis 14.

With the above described arrangement, when drive member 12 is in its disengaged position and rotating in overrunning direction 18 relative to driven member 22 as shown in FIG. 3A, the clearance between dog clutch planar faces 52 and 58 allows drive member 12 to rotate freely. However, when drive member 12 is moved into its engaged position and rotated in torque transmitting direction 20 by the rotational input as shown in FIG. 3B, each engaging edge 56 of each dog 54 is caused to engage shoulder 62 of its corresponding recess 60. This rotationally couples drive member 12 to driven member 22 thereby driving driven member 22 in torque transmitting direction 20.

Although only one specific configuration of dog clutch 28 has been described, it should be understood that dog clutch 28 may take on a wide variety of configurations and still remain within the scope of the invention. For example, dogs 54 may be located on driven member 22 instead of drive member 12 with corresponding recesses 60 being located on drive member 12. Also, the size, number, and shape of the dogs may vary depending on the requirements of the application in which the one way drive device is to be used.

Again referring to FIGS. 3A and 3B, a preferred embodiment of ratchet clutch 30 will be described in detail. In this embodiment, ratchet clutch 30 is an overrunning clutch as disclosed in U.S. Pat. No. 5,070,978 issued to Paul B. Pires on Dec. 10, 1991, which patent is incorporated herein by reference. As mentioned above, ratchet clutch 30 is located between drive member 12 and coupling member 32. Ratchet clutch 30 includes a ratchet clutch planar face 64 on coupling member 32. Ratchet clutch planar face 64 is normal to axis 14 and has at least one pocket 66 in its planar face with each pocket having a shoulder 68. Ratchet clutch 30 also includes a ratchet clutch planar face 70 on drive member 12 which is normal to axis 14 and in close proximity to and in coplanar, confronting relationship with ratchet clutch planar face 64 on coupling member 32. Ratchet clutch planar face 70 has at least one pocket 72 formed into its planar face, each of which has a shoulder 74. Ratchet clutch 30 further includes at least one strut or pawl 76 having opposing edges 78. Each pawl 76 is carried by a corresponding pocket 72 in planar face 70 of drive member 12. Also, each pawl 76 cooperates with a biasing spring 80 mounted within its associated pocket for biasing pawl 76 into an extended position in which pawl 76 protrudes outward from drive member 12 beyond its planar face 70. Each biasing spring 80 and pocket 70 are configured to allow their corresponding pawl 76 to be forced into a second retracted position in which pawl 76 nests within pocket 70 and does not extend beyond planar face 70.

With this arrangement, when drive member 12 is rotating in overrunning direction 18 relative to driven member 22 and coupling member 32 as shown in FIG. 3A, each pawl 76 is periodically forced into its second retracted position by the outer planar edged surface of each shoulder 68 of each pocket 66 in ratchet clutch planar face 64 on coupling member 32. This allows drive member 12 to freely rotate in overrunning direction 18 relative to coupling member 32. When the rotational input drives drive member 12 in torque transmitting direction 20 relative to coupling member 32 as shown in FIG. 3B, at least one pawl 76 carried by drive member 12 engages a shoulder 68 of a confronting pocket 66 in ratchet clutch planar face 64 of coupling member 32 while pawl 76 is in its biased extended position. This engagement of shoulder 68 by pawl 76 rotationally couples coupling member 32 to drive member 12.

Figure 6A:
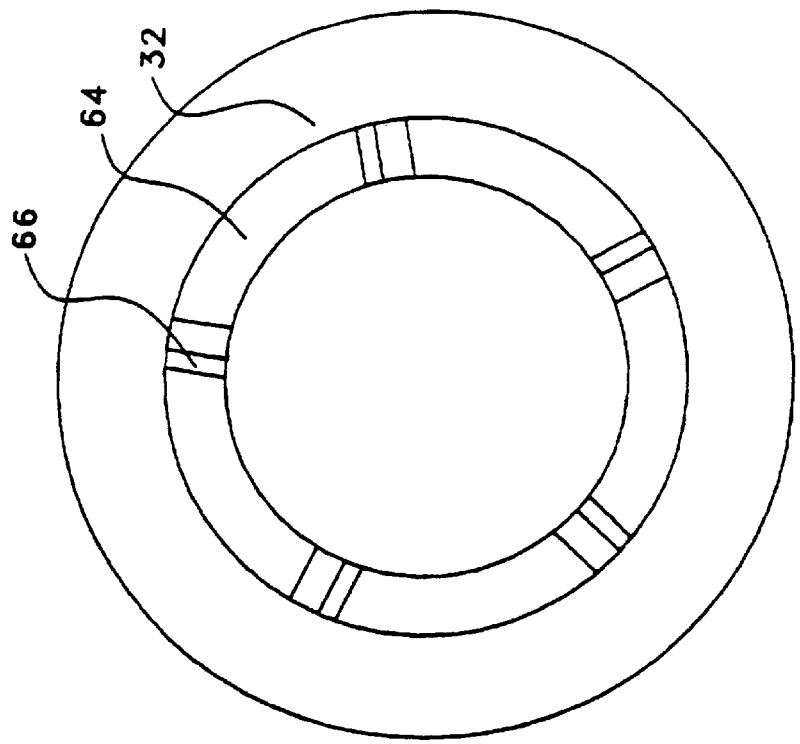
FIG. 6A is a side elevational view of a second side of the coupling member of FIG. 1.
Figure 6B:
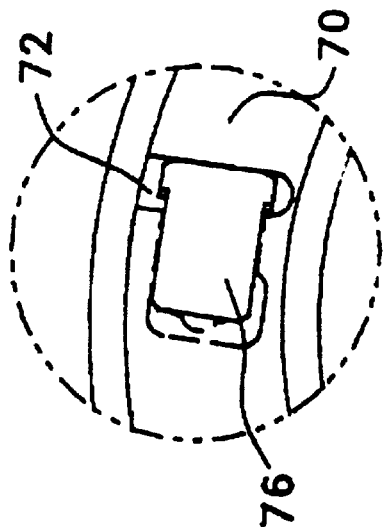
FIGS. 6B, 6B' are side elevational views of a second side of the drive member of FIG. 1.
Figure 6B:
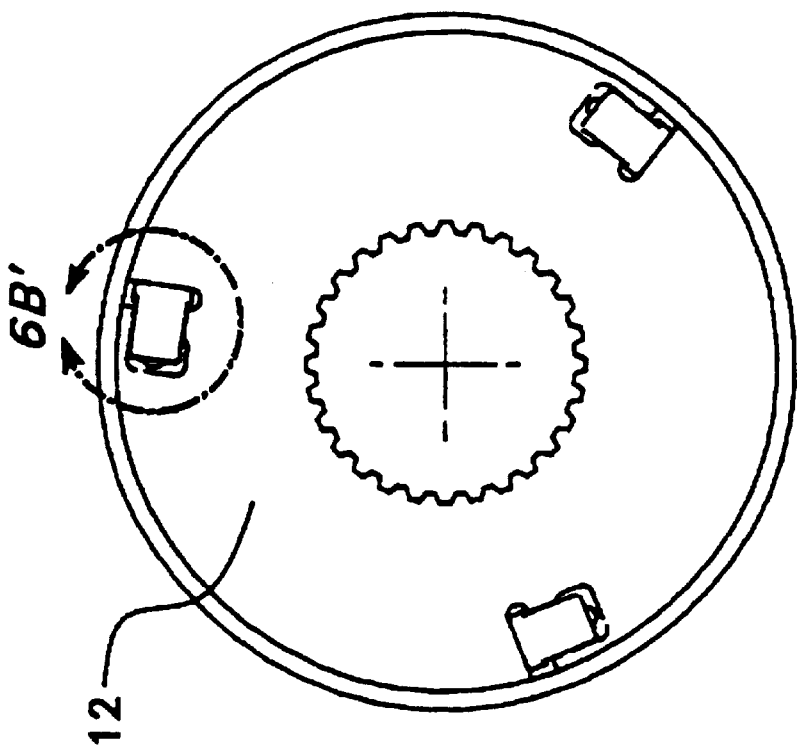

In the particular embodiment being described, as illustrated in FIGS. 6A and 6B which show plan views of ratchet clutch planar faces 70 and 64 respectively, both planar faces include a plurality of pockets with planar face 70 supporting a plurality of pawls 76 in its pockets 72. Pockets 66 and 72 and pawls 76 have a lengthwise axis which extends extend radially outward from axis 14. In this embodiment, these pockets and pawls also are longer along their lengthwise axis than the are wide and are wider than they are thick. As shown in FIG. 6B, pockets 72 in drive member 12 are positioned in planar face 70 in a spaced apart relationship to one another about axis 14. Also, as described in more detail in the above referenced Pires patent and as shown in FIG. 6A, pockets 66 in planar face 64 of coupling member 12 are spaced apart from one another such that one and only one of pawls 76 carried by planar face 70 engages one and only one of shoulders 68 of pockets 66 in planar face 64 of coupling member 32.

Although the ratchet clutch described above is preferably a ratchet clutch of the type describe in the above referenced Pires patent, this is not a requirement of the present invention. Instead ratchet clutch 30 may also be any type of conventional ratchet clutches including traditional ratchet clutches and traction locking clutches such as roller ramp or sprag clutches. In the case of a traditional style ratchet clutch, the ratchet mechanisms may be positioned around the outer peripheral edge of the drive member, and the coupling member would extend around the drive members outer peripheral edge to provide engaging shoulders for the ratchet mechanisms. The function and use of these conventional one way clutches are held to be familiar to those skilled in the art, and therefore, when considered along with this disclosure, are to be regarded as falling within the scope of the present invention. Furthermore, although the pawls of the described ratchet clutch are shown carried by the drive member, it is to be understood that they may alternatively be carried by the coupling member with the engaging pockets carried by the drive member.

Now that the elements of the one way drive device have been described in detail, the overall operation of the device will be described. Referring initially to FIG. 3A, when drive member 12 is rotating in overrunning direction 18 relative to driven member 22, drive member 12 and coupling member 32 are held in their disengaged position by wave spring 40. Because of the clearance between the planar surfaces of the dog clutch when the drive member is in this disengaged position and because of the configuration of the one way ratchet clutch described above, drive member 12 is allowed to rotate freely in the overrunning direction. However, as shown in FIG. 3B and in accordance with the present invention, in response to and as a result of the initial rotational movement of drive member 12 in the torque transmitting direction, ratchet clutch 30 rotationally couples drive member 12 to coupling member 32. As described in detail above, this is accomplished by one of pawls 76 in planar face 70 of drive member 12 engaging one of shoulders 68 of pockets 66 in planar face 64 of coupling member 32. Once coupling member 32 is rotationally coupled to drive member 12 it is driven in torque transmitting 20 along with drive member 12. As also describe in detail above, this initial rotational movement of coupling member 32 in torque transmitting direction 20 causes cam followers 44 on planar face 42 of coupling member 32 to ride up cam surfaces 50 of cam recesses 48 in planar face 46 of attached plate 34. As the cam followers ride up surface 50 coupling member 32 is forced axially along axis 14 moving coupling member 32 and therefore drive member 12 from their disengaged position into their engaged position. With drive member moved to its engaged position, engaging edges 56 of dogs 54 on planar face 52 of drive member 12 engage associated shoulders 62 of recesses 60 in planar face 58 on driven member 22 thereby rotationally coupling drive member 12 and driven member 22. This arrangement allows one way drive device 10 to transmit torque from a rotational input to a rotational output when driven in the torque transmitting direction as well as allow the device to provide an overrun function when the rotational input rotates in the overrun direction relative to the rotational output.

Although only one specific embodiment of the present invention has been described in detail, it should be understood that the present invention may be embodied in many other specific forms without departing from the spirit or scope of the invention. For instance, as mentioned above, although the embodiment described used specific versions of the dog clutch, the ratchet clutch, and the arrangement for moving the drive member between its disengaged and engaged positions, the invention is not limited to these specific versions.

Also, although the above described embodiment has been describe with the various components having particular respective orientations, it should be understood that the present invention may take on a wide variety of specific configurations with the various components being located in a wide variety of positions and mutual orientations and still remain within the scope of the present invention. For example, although the inner member of the described embodiment has been referred to throughout as the drive member and the outer member as the driven member, it should be understood that these members may be reversed. If this were the case, the outer member would be adapted to receive a rotational input and the inner member would be adapted to transmit a rotational output when driven in the torque transmitting direction by the outer member. Also, although the driven member has been described throughout as being movable from a first engaged position to a second disengaged position, it should be understood that it is the relative movement between the drive member and the driven member that is important. For example, if the drive member is fixed to an input drive shaft such that it is prevented from moving axially, the cam followers would move the driven member axially relative to the drive member by moving the attached plate and therefore the driven member axially along the axis of the shaft into the engaged position. The present invention would equally apply to these various configurations.

Therefore, the present examples are to be considered as illustrative and not restrictive, and the invention is not to be limited to the details given herein, but may be modified within the scope of the appended claims.

What is claimed is:

1. A one-way drive device for rotationally coupling an input shaft to an output shaft, the one-way drive device comprising:
   a first member directly coupled to the input shaft for rotation about a longitudinal axis, the first member having a coupling surface and an engaging surface;
   a second member rotatable about the axis, the second member having a coupling surface opposing the coupling surface of the first member;
   a third member coupled to the output shaft, the third member being rotatable about the axis and having an engaging surface opposing the engaging surface of the first member; and
   a coupling element positioned between the coupling surface of the first member and the coupling surface of the second member, the coupling element rotationally coupling the first member to the second member only when the first member is rotated about the axis in a first direction relative to the second member;
   wherein one of the second and third members includes a cam follower and the other of the second and third members includes a camming surface, the cam follower engaging the camming surface to axially displace the second member toward the engaging surface of the third member upon rotation of the second member in the first direction relative to the third member, the engaging surface of the first member engaging the engaging surface of the third member only when the second member is axially displaced toward the engaging surface of the third member.

2. The one-way drive device of claim 1, wherein the camming surface of the other of the second and third members includes a generally-planar surface having at least one camming recess.

3. The one-way drive device of claim 1, including an axial bearing disposed between the first and second members, and a biasing member positioned between the second member and the third member for urging the second member axially away from the engaging surface of the third member.

4. The one-way drive device of claim 3, wherein the coupling surface of the first member and the coupling surface of the second member are each generally normal to the axis.

5. The one-way drive device of claim 4, wherein the coupling surface of the first member includes at least one pocket having a first shoulder, and the coupling surface of the second member includes at least one pocket having a second shoulder, and wherein the coupling element is a pawl, the pawl simultaneously engaging the first shoulder and the second shoulder to rotationally couple the first member to the second member only when the first member rotates in the first direction relative to the second member.

6. A one-way drive device for rotationally coupling an input shaft to an output shaft, the one-way drive device comprising:
   a first member directly coupled to the input shaft for rotation about an axis, the first member having an engaging surface and a coupling surface, the engaging surface of the first member including a dog and the coupling surface of the first member including a first shoulder;
   a second member rotatable about the axis, the second member having a coupling surface opposing the coupling surface of the first member, the coupling surface of the second member including a second shoulder;

a third member coupled to the output shaft and rotatable about the axis, the third member having an engaging surface opposing the engaging surface of the first member, the engaging surface of the third member including an engaging recess;

a pawl disposed between the first coupling surface of the first member and the second coupling surface of the second member, the pawl having a first end and a second end, the first end being engageable with the first shoulder of the first member and the second end being engageable with the second shoulder of the second member to drive the second member with the first member only upon rotation of the first member in a first direction relative to the second member;

an axial bearing disposed between the first and second members; and a spring for urging the second member axially away from the second engaging surface of the third member, wherein one of the second and third members includes a cam follower and the other of the second and third members includes a camming surface, the cam follower engaging the camming surface to axially displace the second member toward the engaging surface of the third member upon rotation of the second member in the first direction relative to the third member, the engaging surface of the first member engaging the engaging surface of the third member only when the second member is axially displaced toward the engaging surface of the third member through engagement of the cam follower with the camming surface.

7. The one-way drive device of claim 6, wherein the camming surface of the other of the second and third members includes a generally-planar surface having at least one camming recess.

8. The one-way drive device of claim 7, wherein the coupling surface of the first member and the coupling surface of the second member are each generally normal to the axis.

9. The one-way drive device of claim 8, wherein the first shoulder of the first member is defined by a pocket formed in the first coupling surface of the first member, and wherein the second shoulder of the second member is defined by a pocket formed in the second coupling surface of the second member.

10. A one-way drive device for rotationally coupling an input shaft to an output shaft, the one-way drive device comprising:

a first member directly coupled to the input shaft for rotation therewith about an axis, the first member having a first engaging surface on one axial end thereof and first coupling surface generally normal to the axis, the first engaging surface including at least one dog and the first coupling surface including a first pocket defining a first shoulder;

a second member rotatable about the axis and having a second coupling surface generally normal to the axis and in opposition to the first coupling surface of the first member, the second coupling surface including a second pocket defining a second shoulder, the second member including a cam follower;

a third member coupled to the output shaft and rotatable about the axis, the third member having a second engaging surface in opposition with the first engaging surface of the first member, and a camming surface engageable with the cam follower of the second member such that the second member is axially displaced toward the second engaging surface of the third member only upon rotation of the second member in the first direction relative to the third member, each dog of the first member engaging a respective engaging recess of the third member when the second member is axially displaced toward the second engaging surface of the third member through engagement of the cam follower of the second member with the camming surface of the third member;

a pawl having a first end and a second end, the first end being engageable with the first shoulder of the first coupling surface and the second end being engageable with the second shoulder of the second coupling surface to drive the second member with the first member only upon rotation of the first member in a first direction relative to the second member;

a bearing disposed between the first member and the second member; and a spring for urging the second member axially away from the second engaging surface of the third member.

11. The one-way drive device of claim 10, wherein the cam follower of the second member extends generally axially, and wherein the camming surface of the third member includes a generally planar surface having at least one camming recess.

* * * * *